April 19, 1949.  D. B. HOOVER ET AL  2,467,751
DUAL CIRCUIT GENERATOR
Filed Feb. 28, 1947
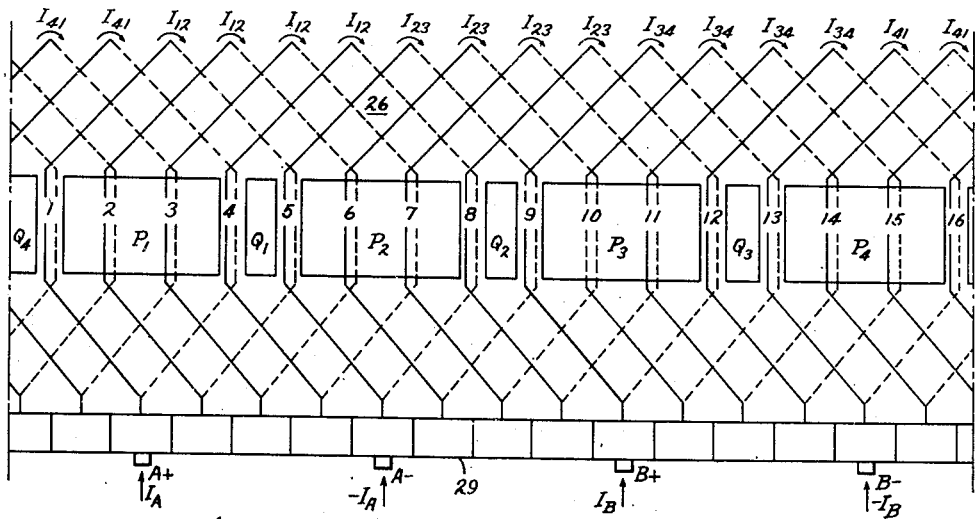
Fig. 1.
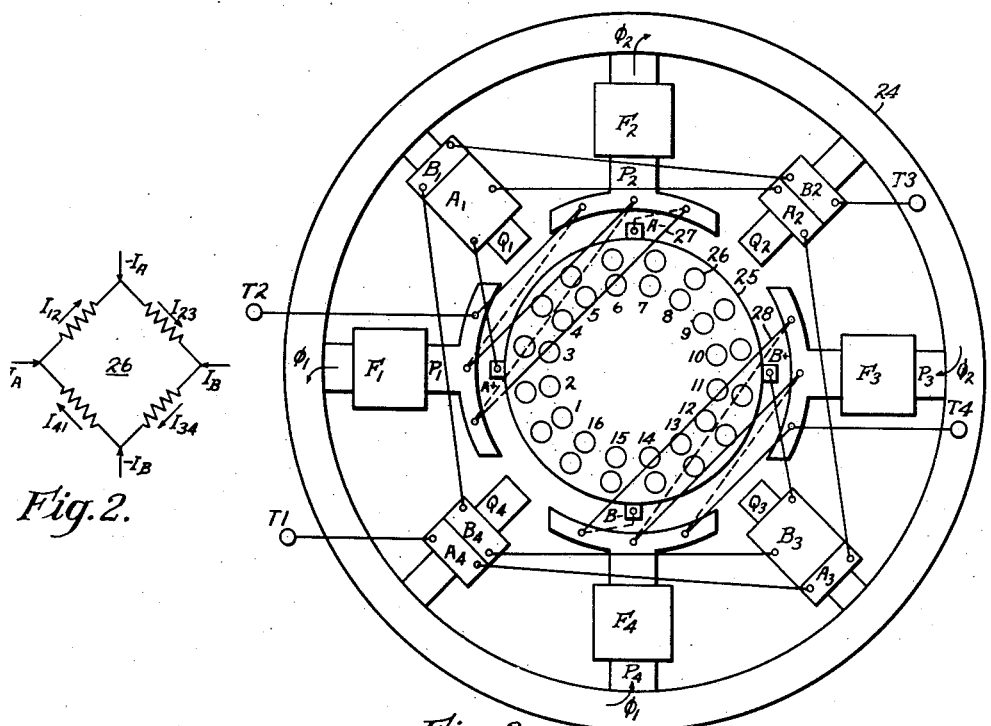
Fig. 2.
Fig. 3.
WITNESSES:
Edward Michaels
INVENTORS
Dillon B. Hoover &
Gurney L. Godwin.
BY
O. B. Buchanan
ATTORNEY Patented Apr. 19, 1949

2,467,751

UNITED STATES PATENT OFFICE 2,467,751

DUAL CIRCUIT GENERATOR

Dillon B. Hoover, Edgewood, and Gurney L. Godwin, Pittsburgh, Pa., assignors to Westinghouse Electric Corporation, East Pittsburgh, Pa., a corporation of Pennsylvania Application February 28, 1947, Serial No. 731,464

6 Claims. (Cl. 171—228)

Our invention relates to dual-circuit direct-current generators such as are used for powering the different movements of a power-shovel, or the like. Such generators are multipolar direct-current generators having lap-wound armatures without cross-connections. In general, each pair of brushes feeds a separate load-circuit, and has a separate field-winding control so that the direction and magnitude of each load-circuit voltage can be independently varied. Heretofore, such generators have been built approximately as described in the Hathaway Patent 2,003,688, granted June 4, 1935.

The practical limit which determines the rating of such a machine is its commutating ability. The commutating ability depends upon the accuracy with which the interpoles of any such machine can be excited with the necessary commutating and compensating currents for each load-circuit of the generator, regardless of the magnitude or direction of the currents which are being supplied by the other load-circuit or circuits of the generator. The Hathaway machine utilized only half as many interpoles as main poles, and specified, by preference, a special armature-coil chording designed to prevent interconnection between the different load-circuits of the generator.

The object of our invention is to supply an accurate interpole excitation for such machines, for supplying the necessary compensating and commutating ampere-turns, thereby considerably increasing its commutating ability, and hence increasing its rating, over that which was obtainable with the Hathaway design.

With the foregoing and other objects in view, our invention consists in the circuits, systems, combinations, parts and design-methods hereinafter described and claimed, and illustrated in the accompanying drawing, wherein Figure 1 is a diagrammatic development of a simple armature-winding illustrative of the principles of our invention, Fig. 2 is an equivalent-circuit diagram of the armature winding, and Fig. 3 is a diagrammatic end-view representation of an entire dual-circuit generator, built in accordance with our invention.

In Fig. 3 we have illustrated our invention in connection with a 4-pole dual-circuit (or multiple-circuit) generator or motor having two circuits; but it is to be understood that the invention is applicable, in general, to $2p$-pole dynamo-electric machines having $p$ circuits. Our description and analysis will first be directed to a 4-pole machine, which is the most important commercially, and then the analysis will be generalized to apply to machines having any pole-number $2p$.

Fig. 3 shows a dual-circuit direct-current generator having a field frame comprising a stationary yoke-member 24 having four main poles $P_1$, $P_2$, $P_3$ and $P_4$, and four commutating poles or interpoles $Q_1$, $Q_2$, $Q_3$ and $Q_4$. In Fig. 3, the machine has a rotating armature 25, which is diagrammatically represented by a single circle which represents both the armature-core and the commutator. Four brushes $A+$, $A-$, $B+$ and $B-$ bear on the commutator, shown as being under the respective main poles $P_1$, $P_2$, $P_3$ and $P_4$. The armature 25 is illustrated as having a two-layer lap-winding 26 which is conventional except that it has no cross-connections, or armature equalizer-connections. A very simple armature is illustrated, having sixteen slots, numbered 1 to 16. In Fig. 3, each main pole has a main exciting-winding or field-winding F, with a subscript corresponding to the numbering of the pole; and each interpole has two commutating windings A and B, with subscripts corresponding to the numbering of the pole. The interpole $Q_1$ follows the main pole $P_1$, that is, it is between the main poles $P_1$ and $P_2$.

It is frequently advantageous, as will subsequently be pointed out, to use pole-face compensating-windings 27 and 28, one for each of the pairs of brushes $A+$, $A-$ and $B+$, $B-$, as shown in Fig. 3. These are distributed windings, illustrated as concentric windings, having coil-sides lying in the pole-face portions of the main poles $P_1$, $P_2$ and $P_3$, $P_4$. They compensate or neutralize some 60%, more or less, of the ampere-turns of the armature-winding 26, so as to reduce the armature-reaction.

The external winding-circuits of the generator which is shown in Fig. 3 include a terminal T1 which is connected to the brush $A+$ through the four serially connected interpole-coils $A_1$, $A_2$, $A_3$ and $A_4$; a terminal T2 which is connected to the brush $A-$ through the distributed compensating-winding 27; a terminal T3 which is connected to the brush $B+$ through the four serially connected interpole-coils $B_3$, $B_4$, $B_1$ and $B_2$; and a terminal T4 which is connected to the brush $B-$ through the distributed compensating-winding 28.

The magnitude and the polarity of the armature-voltage which is produced in the brushes $A+$ and $A-$ is determined by the magnitude and the polarity or direction of the exciting-current in the two field-windings $F_1$ and $F_2$; while the magnitude and the polarity of the armature-voltage which is produced in the brushes B+ and B— is independently determined by the magnitude and the polarity or direction of the exciting-current in the other two field-windings F₃ and F₄. The plus and minus signs after the letters A and B, as applied to the two pairs of brushes, do not necessarily indicate the directions or polarities of the brush-voltages.

Fig. 1 shows a schematic development of the armature-winding 26, showing the commutator 29, with the four brushes A+, A—, B+ and B—, and with the four armature-currents $I_A$, $-I_A$, $I_B$ and $-I_B$ entering the armature through the respective brushes A+, A—, B+ and B—.

Fig. 2 shows the armature-winding 26 as being divided diagrammatically into four sections, with the four brush-currents $I_A$, $-I_A$, $I_B$ and $-I_B$ entering at the apices between successive sections, and with the four section-currents $I_{12}$, $I_{23}$, $I_{34}$ and $I_{41}$, each having two subscripts indicating first the pole-numbering of the pole under which the top coil-sides are located, as shown by the solid lines in Fig. 1, while the second subscript of each section-current, in Figs. 1 and 2, indicates the pole-numbering of the pole under which the bottom coil-sides of the respective armature-coils are located, as shown by dotted lines in Fig. 1.

The analysis of the design and operation of a four-pole machine, as shown in the drawing, may conveniently be made by first assuming that current is flowing only in the A brushes A+ and A—, and determining the numbers of turns $A_1$, $A_2$, $A_3$ and $A_4$ which are needed in the $I_A$-energized interpole-coils having the same reference-characters $A_1$, $A_2$, $A_3$ and $A_4$, respectively. After this has been done, the machine may be similarly adjusted for any current flowing in the B brushes B+ and B—, by assigning the proper numbers of turns $B_1$, $B_2$, $B_3$ and $B_4$ to the respective $I_B$-energized interpole-coils having the same reference-characters $B_1$, $B_2$, $B_3$ and $B_4$.

Each interpole coil-number, such as $A_1$, will be separately analyzed for two coil-number components, so that the ampere-turns of that interpole-coil will include $I_A A_{m1}$ ampere-turns which are needed to compensate for, or neutralize, the ampere-turns which are effective, in the armature, to try to drive an armature-reaction flux through that interpole, plus $I_A A_{m1}$ ampere-turns which are needed, in the interpole-coil $A_1$, in order to produce the interpole-flux which is needed to sparklessly commutate the armature coils undergoing commutation and having coil-sides under that interpole $Q_1$.

Thus, if (1)     $I_A = I$ and $I_B = 0$ reference to Fig. 2 will show that the armature-current, $I_A = I$, divides in the two armature-paths in inverse proportion to the resistances, so that (2)     $I_{12} = \frac{3}{4}I$ and $I_{23} = I_{34} = I_{41} = -\frac{1}{4}I$ The total current flowing in each of the sixteen armature-slots 1 to 16 is the algebraic sum of the current flowing in the top coil-side and the current flowing in the bottom coil-side in that slot. Under the first main pole $P_1$ in Fig. 1, the current in each of the top coil-sides is $I_{12}$, as indicated by the first number in its subscript, while the current in each bottom coil-side is $-I_{41}$, as indicated by the second number in its subscript, the negative sign being used because the current-directions are determined by the assumed directions of current-flow in the top sides of the respective armature-coils.

We may therefore put down the total current flowing in each slot under each of the main poles $P_1$, $P_2$, $P_3$ and $P_4$ as (3)  $I_{p1} = I_{12} - I_{41} = I =$ total current in slots 1-4
     $I_{p2} = I_{23} - I_{12} = -I =$ total current in slots 5-8
     $I_{p3} = I_{34} - I_{23} = 0 =$ total current in slots 9-12
     $I_{p4} = I_{41} - I_{34} = 0 =$ total current in slots 13-16

It will be noted that the total current, I, flows in each slot of a band of armature-slots extending from the interpole $Q_4$ to the interpole $Q_1$, and that the total slot-current, $-I$, occurs in another band from the interpole $Q_1$ to the interpole $Q_2$. All of the other armature-slots, 9 to 16, have zero total current when the second load-circuit current $I_B$ is zero; that is, in each of the zero-current slots 9 to 16 the current in the top coil-side is exactly equal and opposite to the current in the bottom coil-side.

Let us now consider the magnetic ampere-turn potential, or the ampere-turns of the armature-winding magnetomotive-force, and its effect in making up the armature-reaction. Let the magnetic potential of the center of the armature-core be the reference-potential 0. Then the surface of the armature at each of the zero-current slots 9-16 will also be at the zero magnetic potential, so far as the armature-reaction due to the armature-current $I_A = I$ is concerned, which is all that we are considering at the present moment.

Let us designate the effective armature-winding turns per pole as $2T$. In Fig. 1, a full-pitch armature winding is shown, in which case the effective armature-winding turns per pole, is the unshorted armature-turns in one-quarter of the armature, minus one half of the compensating-winding turns which are distributed across two pole-faces. Most armature-windings are not full-pitch, but are chorded, usually by ½ slot, although a 1-slot chording is sometimes used with an even number of slots per pole. When the armature-winding is chorded, the effective armature ampere-turns are obtained by introducing a chording-factor or coefficient, in a known manner.

There is no armature reaction magnetic potential tending to produce a circulating armature-reaction flux through the two main poles $P_1$ and $P_2$ corresponding to the armature-current $I_A = I$, because the effective armature ampere-turns in the slots 3 and 4 between the main pole $P_1$ and the interpole $Q_1$, tending to make flux flow outwardly, away from the armature is exactly opposed by the effective armature ampere-turns in the slots 5 and 6, between the interpole $Q_1$ and the main pole $P_2$, as will be seen from Fig. 3.

However, the effective armature ampere-turns, IT, in the portion of the armature-winding 26 between the interpole $Q_4$ and the main pole $P_1$ (see Fig. 3), will create a positive magnetic potential IT at the surface of the armature-core 25 at a point under the center of the main pole $P_1$; while the effective armature ampere-turns, $-IT$, in the portion of the armature-winding 26 between the interpole $Q_2$ and the main pole $P_2$ (see Fig. 3), will create a negative-negative (or positive) magnetic potential, $-(-IT) = IT$, at the surface of the armature-core 25 at a point under the center of the main pole $P_2$. These armature-reaction magnetic potentials or ampere-turns IT will tend to make both of the main poles P₁ and P₂ negative poles, with fluxes $\phi_1$ and $\phi_2$ respectively, passing out, away from the armature 25. These fluxes $\phi_1$ and $\phi_2$ cannot return through either of the main poles P₁ or P₂, but each flux must return to the armature through one-half of the remaining main poles of the machine, considering that none of the armature-reaction flux will return through the interpoles which will be separately compensated for by the several interpole-windings A₁ and B₁ on interpole Q₁, A₂ and B₂ on interpole Q₂, etc., as will be subsequently explained. In the case of a 4-pole machine, as illustrated, the armature-reaction flux $\phi_1$ of pole P₁ will return to the armature-core 25 through the frame-yoke 24 and the pole P₄, as shown; while the armature-reaction flux $\phi_2$ of pole P₂ will return to the armature-core 25 through the frame-yoke 24 and the pole P₃, as shown.

Considering that the magnetic reluctance of the iron paths in the armature-core 25, the main poles P₁ to P₄, and the frame-yoke 24 is negligible as compared to the magnetic reluctance R of one airgap between one main poleface and the iron armature-core 25, we may determine the magnetic potential $H_f$ which is impressed on the frame-parts 24, P₁, P₂, P₃ and P₄ by the armature-reaction magnetic potential IT operating through the main poles P₁ to P₄. Thus, we may pass from the armature-surface potential IT, under the center of either one of the two main poles P₁ or P₂, across the gap-reluctance R, obtaining the magnetic frame-potential, (4) $\quad H_f = IT - R\phi_1 = IT - R\phi_2 = IT - R\dfrac{IT}{2R} = \tfrac{1}{2}IT$ Or we may pass from the zero armature-potential 0, under either of the other main poles P₃ or P₄, across the airgap reluctance into that pole, P₃ or P₄, obtaining the magnetic frame-potential, (5) $\quad H_f = 0 - R(-\phi_1) = 0 - R(-\phi_2) = 0 - R\left(-\dfrac{IT}{2R}\right) = \tfrac{1}{2}IT$ Knowing the magnetic frame-potential $$H_f = \tfrac{1}{2}IT$$

which is produced in the frame 24 by the armature-reaction fluxes $\phi_1$ and $\phi_2$ in the main poles, it is now possible to calculate the portions of the interpole ampere-turns which are needed to compensate for the armature-reaction, that is, to produce no interpole flux as a result of the flow of the armature-current $I_A = I$.

In the case of the interpole Q₁, the magnetic potential of the surface of the armature-core 25 under the center of this interpole is the ampere-turns resulting from both the band of armature-slots 1, 2, 3 and 4, between the center of the interpole Q₄ and the center of the interpole Q₁, making a total of 2IT which has to be compensated for by the $A_{n1}$-portion of the interpole winding A₁, in order to produce the magnetic frame-potential $H_f = \tfrac{1}{2}IT$ of the yoke 24. Hence the equation, (6) $\quad 2IT + IT_{n1} = \tfrac{1}{2}IT$, or $A_{n1} = -\tfrac{3}{2}T$ In the case of each of the other interpoles Q₂, Q₃, Q₄, the magnetic potential of the armature-surface is zero, and we obtain the equation, (7) $\quad A_{n2} = A_{n3} = A_{n4} = \tfrac{1}{2}T$ for the portions of the interpole-windings A₂, A₃ and A₄ which are necessary to produce the magnetic frame-potential $H_f = \tfrac{1}{2}IT$ in the backs of the several interpoles Q₂, Q₃, and Q₄ at the points where they join the yoke 24.

With the interpole winding-portions $A_{n1}$ to $A_{n4}$ energized by the armature-current $I_A = I$, there will be no magnetizing force or magnetic potential-difference tending to produce a flux in any of the interpoles, unless the interpole-windings A₁ to A₄ include additional turns other than the turn-components $A_{n1}$ to $A_{n4}$.

However, additional interpole ampere-turns $IA_{m1}$, $IA_{m2}$, $IA_{m3}$, and $IA_{m4}$ are needed on the several interpoles Q₁ to Q₄ respectively, in order to produce interpole-fluxes large enough to sparklessly commutate the currents in the coil-sides under each interpole, respectively. Thus, in Fig. 3, or in Fig. 1, let us suppose that the upper and lower coil-sides in slot 5 are lying under the interpole Q₁ and are undergoing commutation. The top coil-side in slot 5 is a part of an armature-coil having its bottom coil-side in slot 9, in the armature-winding as shown in Fig. 1, in which the current is changing from $I_{12}$ to $I_{23}$, as shown in Fig. 1, while the bottom coil-side in slot 5 is a part of an armature-coil having its top coil-side in slot 1, as shown in Fig. 1, so that the current is changing from $-I_{41}$ to $-I_{12}$. The total current-change, in the slot 5 under the interpole Q₁, is therefore (8) $\quad I'_1 = (I_{23} - I_{12}) + (-I_{12} + I_{41}) =$
$\quad\quad -\tfrac{1}{4}I - \tfrac{3}{4}I - \tfrac{3}{4}I - \tfrac{1}{4}I = -2I$ It will likewise be seen that the total current-changes, in the slots 9, 13 and 1, under the interpoles Q₂, Q₃ and Q₄, are respectively, (9) $\quad I'_2 = (I_{34} - I_{23}) + (-I_{23} + I_{12}) =$
$\quad\quad -\tfrac{1}{4}I + \tfrac{1}{4}I + \tfrac{1}{4}I + \tfrac{3}{4}I = I$
(10) $\quad I'_3 = (I_{41} - I_{34}) + (-I_{34} + I_{23}) =$
$\quad\quad -\tfrac{1}{4}I + \tfrac{1}{4}I + \tfrac{1}{4}I - \tfrac{1}{4}I = 0$
(11) $\quad I'_4 = (I_{12} - I_{41}) + (-I_{41} + I_{23}) =$
$\quad\quad \tfrac{3}{4}I + \tfrac{1}{4}I + \tfrac{1}{4}I - \tfrac{1}{4}I = I$ Assuming that IM are the ampere-turns required to produce an interpole-flux large enough to commutate a total current-change of $+2I$ in the slot under the interpole, it follows that the portions $A_m$ of the $I_A$-excited interpole-coils I, to I₄, necessary to sparklessly commutate the current-changes found in Equations 8 to 11, are, respectively,

(12) $\quad A_{m1} = -M;\ A_{m2} = \tfrac{1}{2}M;$
$\quad\quad A_{m3} = 0;\ \text{and}\ A_{m4} = \tfrac{1}{2}M$ Summing the interpole-turns necessary for compensation, and the interpole-turns necessary for commutation, shows the numbers of turns necessary on the four $I_A$-excited interpole-coils A₁, A₂, A₃ and A₄, as follows:

(13) $\quad A_1 = A_{n1} + A_{m1} = -\tfrac{3}{2}T - M = -\dfrac{3T + 2M}{2}$ $\quad\quad A_2 = A_{n2} + A_{m2} = \tfrac{1}{2}T + \tfrac{1}{2}M = \dfrac{T + M}{2}$ $\quad\quad A_3 = A_{n3} + A_{m3} = \tfrac{1}{2}T + 0 = \tfrac{1}{2}T$ $\quad\quad A_4 = A_{n4} + A_{m4} = \tfrac{1}{2}T + \tfrac{1}{2}M = \dfrac{T + M}{2}$ In these equations, the minus sign for the A₁ coil indicates that the current is reversed.

While our foregoing derivations and explanations have been directed more particularly to a four-pole dual-circuit generator, the invention is generally applicable, say to a 2p-pole generator having p separately controllable circuits A, B, C, etc., where p may be 2, 3, or any larger number. Designating the successive poles by the subscripts from 1 to $2p$, respectively, and otherwise using the notations already explained, the equations may be rewritten as follows:

(1′) $\quad I_A = I$, and $I_B = I_C$, etc., $= 0$ (2′) $\quad I_{12} = \dfrac{2p-1}{2p} I$, and $I_{23} = I_{34} = \ldots = I_{(2p)1} = -\dfrac{1}{2p} I$ (3′) $\quad I_{p1} = -I_{p2} = I$ while all of the other totalized slot-currents are zero.

(4′) $\quad H_f = IT - R\phi_1 = IT - R\phi_2 = IT - R\dfrac{p-1}{pR} IT = \dfrac{1}{p} IT$ (5′) $\quad H_f = 0 \dfrac{1}{p-1} R(-\phi_1) =$ $\quad 0 - \dfrac{1}{p-1} R(-\phi_2) = 0 - \dfrac{1}{p-1} R\left(-\dfrac{p-1}{pR} IT\right) = \dfrac{1}{p} IT$ (6′) $\quad 2IT + IA_{n1} = H_f = \dfrac{1}{p} IT$, and thus $A_{n1} = -\dfrac{2p-1}{p} T$ (7′) $\quad A_{n2} = A_{n3} = \ldots = A_{n(2p)} = H_f = \dfrac{1}{p} IT$ (8′) $\quad I'_1 = -2I; I'_2 = I; I'_{(2p)} = I; I'_3 = I'_4 = \ldots = I_{(2p-1)}' = 0$ (12′) $\quad A_{m1} = -M; A_{m2} = A_{m(2p)} = \tfrac{1}{2} M; A_{m3} = A_{m4} = \ldots = A_{m(2p-1)} = 0$ (13′) $\quad A_1 = -\dfrac{2p-1}{p} T - M = -\dfrac{(2p-1)T + pM}{p}$ $\quad A_2 = \dfrac{1}{p} T + \tfrac{1}{2} M = \dfrac{2T + pM}{2p}$ $\quad A_3 = A_4 = \ldots = A_{(2p-1)} = \dfrac{1}{p} T$ $\quad A_{(2p)} = \dfrac{2T + pM}{2p}$ The foregoing analysis shows what excitations are needed on the $2p$ interpoles in the coils $A_1$ to $A_{(2p)}$ which are excited by the current $I_A$. If another current $I_B$ is flowing, in the next pair of brushes B+ and B−, the armature-reaction and the current-changes due to this current must be provided for by a set of interpole-coils $B_1$ to $B_{(2p)}$ which are excited by the current $I_B$, the numbers of turns in these B− coils being (13ᴮ) $\quad B_3 = -\dfrac{(2p-1)T + pM}{p}$ $\quad B_4 = \dfrac{2T + pM}{2p}$ $\quad B_5 = \ldots = B_{(2p)} = B^1 = \dfrac{1}{p} T$ $\quad B_2 = \dfrac{2T + pM}{2p}$ If there is a third armature circuit, carrying a current $I_C$, there must be a set of $I_C$-energized interpole-coils having numbers of turns as follows:

(13ᶜ) $\quad C_5 = -\dfrac{(2p-1)T + pM}{p}$ $\quad C_6 = \dfrac{2T + pM}{2p}$ $\quad C_7 = \ldots = C_{(2p)} = C_1 = C_2 = C_3 = \dfrac{1}{p} T$ $\quad C_4 = \dfrac{2T + pM}{2p}$ If there are any more circuits, each must have its own set of interpole coils.

Turning, again, to the specific case of a four-pole machine, where $p = 2$, it will be noted that the first and third interpoles, $Q_1$ and $Q_3$, each have a coil having $$\dfrac{3T + 2M}{2}$$

turns and a coil having $\tfrac{1}{2} T$ turns, making a total of $(2T + M)$ turns; while each of the other interpoles, $Q_2$ and $Q_4$, has two coils of $$\dfrac{T + M}{2}$$

turns, making a total of $(T + M)$ turns. The standard interpole coil, for an ordinary single-circuit machine, has $(T + M)$ turns, all in a single coil. In an ordinary machine, having no compensating windings, C is equal to approximately $0.2T$, so that the standard interpole-coil has approximately $1.2T$ turns. On this basis, our new machine, if it had no pole-face-distributed commutating-windings 27 and 28, would require $2.2T$ turns on interpoles $Q_1$ and $Q_3$, or 183% of the interpole winding-space of a normal machine, on these two interpoles, while the other two interpoles would require a normal winding-space of $1.2T$ turns.

In most machines, the interpole-coil winding-space is not the limiting factor in the design of the machine, and therefore the required interpole-coils may be added, in accordance with our invention, with little or no change in dimensions, from the standard machine.

Heretofore, dual-circuit generators have been built with only one interpole-coil on each interpole, excited by the current in only one of the two or more separate external armature load-circuits, and these machines have had to be built considerably oversize, because of the poor commutating-conditions. When the interpoles are properly excited, by currents from all of the independently controlled armature-currents, in accordance with our invention, we have not had to materially increase the size of machine over the size of a standard single-current machine, and we have been able to commutate a peak-current of approximately 50% more than was possible in the Hathaway dual-circuit machine having a single coil on each interpole.

The use of pole-face-distributed compensating-windings 27 and 28 has the effect of reducing the value of the effective armature-turns T per pole, thus considerably reducing the winding-space of the two interpoles $Q_1$ and $Q_3$ having oversize coils totalling $(2T + M)$ turns.

While we have illustrated and described our invention in connection with a two-circuit four-pole direct-current dynamo-electric machine, with reference also to a broadly defined dual-circuit machine having $p$ circuits and $2p$ poles, our invention is nevertheless subject to considerable variation, and even to application to the design of alternating-current machines.

For example, a two-circuit four-pole machine, having four interpoles, has identical excitations on the interpoles $Q_2$ and $Q_4$, so that these two interpoles could be omitted altogether if the commutating turns $\tfrac{1}{2} M$ of each of these interpoles were added to the retained interpoles $Q_1$ and $Q_3$, making

(14) $\quad A_1 = -\tfrac{3}{2}(T + M)$
$\quad B_1 = \tfrac{1}{2}(T - M)$
$\quad A_3 = \tfrac{1}{2}(T - M)$
$\quad B_3 = -\tfrac{3}{2}(T + M)$ We desire, therefore, that the appended claims be accorded the broadest construction consistent with their language.

We claim as our invention:

1. A multi-circuit multipolar direct-current generator having a lap-wound armature without equalizer-connections, having main poles and interpoles, and having a pair of brushes for each pair of main poles, said generator having a plurality of external circuits taken off from said armature through a plurality of pairs of brushes, characterized by said generator having a separate interpole-coil for each of said external circuits for each of the interpoles.

2. A multi-circuit multipolar direct-current generator having a lap-wound armature without equalizer-connections, having main poles and interpoles, and having a pair of brushes for each pair of main poles, said generator having a plurality of external circuits taken off from said armature through a plurality of pairs of brushes, the main poles having pole-face portions, and distributed compensating-windings carried by the pole-face portions of a plurality of pairs of main poles, characterized by said generator having a separate interpole-coil for each of said external circuits for each of the interpoles.

3. A generator as described in claim 1, having as many interpoles as main poles, and characterized by the first interpole-winding of each circuit having substantially $(2p-1)T/p+M$ turns, connected in negative polarity, the second and last interpole-windings of each circuit having substantially $(2T+pM)/2p$ turns, connected in positive polarity, and all of the remaining interpole-windings of each circuit having substantially $T/p$ turns, connected in positive polarity, where $2p$ is the number of main poles, $2T$ is the effective number of armature-winding turns per pole, and $M$ is the number of interpole-winding turns, which, when excited by a current $I$, will produce an interpole-flux suitable for sparklessly commutating a total current-change of $2I$ in the armature-slot under the interpole.

4. A generator as described in claim 2, having as many interpoles as main poles, and characterized by the first interpole-winding of each circuit having substantially $(2p-1)T/p+M$ turns, connected in negative polarity, the second and last interpole-windings of each circuit having substantially $(2T+pM)/2p$ turns, connected in positive polarity, and all of the remaining interpole-windings of each circuit having substantially $T/p$ turns, connected in positive polarity, where $2p$ is the number of main poles, $2T$ is the effective number of armature-winding turns per pole, and $M$ is the number of interpole-winding turns, which, when excited by a current $I$, will produce an interpole-flux suitable for sparklessly commutating a total current-change of $2I$ in the armature-slot under the interpole.

5. A four-pole two-circuit generator as described in claim 1, having only two interpoles, each interpole being between the main poles of one pair, corresponding to one circuit, said generator being characterized by the interpole-winding of the circuit corresponding to said pair of main poles having substantially $3(T+M)/2$ turns, connected in negative polarity, and the interpole-winding of the other circuit having substantially $(T-M)/2$ turns, connected in positive polarity, where $2T$ is the effective number of armature-winding turns per pole, and $M$ is the number of interpole-winding turns, which, when excited by a current $I$, will produce an interpole-flux suitable for sparklessly commutating a total current-change of $2I$ in the armature-slot under the interpole.

6. A four-pole two-circuit generator as described in claim 2, having only two interpoles, each interpole being between the main poles of one pair, corresponding to one circuit, said generator being characterized by the interpole-winding of the circuit corresponding to said pair of main poles having substantially $3(T+M)/2$ turns, connected in negative polarity, and the interpole-winding of the other circuit having substantially $(T-M)/2$ turns, connected in positive polarity, where $2T$ is the effective number of armature-winding turns per pole, and $M$ is the number of interpole-winding turns, which, when excited by a current $I$, will produce an interpole-flux suitable for sparklessly commutating a total current-change of $2I$ in the armature-slot under the interpole.

DILLON B. HOOVER.
GURNEY L. GODWIN.

REFERENCES CITED

The following references are of record in the file of this patent:

UNITED STATES PATENTS

| Number | Name | Date |
|---|---|---|
| 1,088,781 | Kelly | Mar. 3, 1914 |
| 2,003,688 | Hathaway | June 5, 1935 |